US009711083B2

(12) United States Patent
Kim et al.

(10) Patent No.: US 9,711,083 B2
(45) Date of Patent: Jul. 18, 2017

(54) ORGANIC LIGHT-EMITTING DISPLAY APPARATUS

(71) Applicant: SAMSUNG DISPLAY CO., LTD., Yongin, Gyeonggi-Do (KR)

(72) Inventors: Na-Young Kim, Yongin (KR); Ki-Nyeng Kang, Yongin (KR); Jung-In Lee, Yongin (KR); Jae-Beom Choi, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 317 days.

(21) Appl. No.: 14/445,330

(22) Filed: Jul. 29, 2014

(65) Prior Publication Data

US 2015/0103103 A1 Apr. 16, 2015

(30) Foreign Application Priority Data

Oct. 14, 2013 (KR) ........................ 10-2013-0122196

(51) Int. Cl.
*G06F 1/00* (2006.01)
*G09G 3/3233* (2016.01)

(52) U.S. Cl.
CPC ... *G09G 3/3233* (2013.01); *G09G 2300/0413* (2013.01); *G09G 2300/0439* (2013.01); *G09G 2300/0809* (2013.01); *G09G 2330/08* (2013.01)

(58) Field of Classification Search
CPC ......... G09G 3/3241; G09G 2300/0413; G09G 2300/0426; G09G 1/00; G09G 2300/00
See application file for complete search history.

(56) References Cited

U.S. PATENT DOCUMENTS

| | | | | |
|---|---|---|---|---|
| 2012/0092599 A1* | 4/2012 | Lee | G02F 1/133784 349/106 |
| 2012/0306732 A1* | 12/2012 | Sugihara | G02F 1/134336 345/88 |
| 2014/0292827 A1 | 10/2014 | Kang et al. | |

FOREIGN PATENT DOCUMENTS

| | | | |
|---|---|---|---|
| JP | 2003-050400 A | 2/2003 |
| JP | 2004-086223 A | 3/2004 |
| JP | 2009-003009 A | 1/2009 |
| KR | 10-2008-0024009 A | 3/2008 |
| KR | 10-2014-0119584 A | 10/2014 |

* cited by examiner

*Primary Examiner* — Michael Faragalla
(74) *Attorney, Agent, or Firm* — Lee & Morse, P.C.

(57) ABSTRACT

A display apparatus includes a plurality of sub-pixel groups. At least one of the sub-pixel groups includes a plurality of first sub-pixels to emit a first color of light, a plurality of second sub-pixels to emit a second color of light, and a dummy pixel between the first sub-pixels and the second sub-pixels. A first dummy driving transistor is connectable to one of the first sub-pixels and a second dummy driving transistor is connectable to one of the second sub-pixels.

20 Claims, 10 Drawing Sheets

ORGANIC LIGHT-EMITTING DISPLAY APPARATUS

CROSS-REFERENCE TO RELATED APPLICATION

Korean Patent Application No. 10-2013-0122196, filed on Oct. 14, 2013, and entitled, "Organic Light-Emitting Display Apparatus," is incorporated by reference herein in its entirety.

BACKGROUND

1. Field

One or more embodiments described herein relate to a display apparatus.

2. Description of the Related Art

When a defect occurs in a pixel, the pixel may emit light continuously regardless of whether a scan signal and a data signal are received. The light emitted by the defective pixel may be recognized as a bright spot that is visually noticeable by a viewer.

Attempts have been made to correct bright spot. One approach involves changing the defective pixel to be recognized as a dark spot, e.g., one in which light emission is impossible. However, this approach does not repair the defective pixel to be a normal pixel. It merely changes the pixel from one defective state to another.

SUMMARY

In accordance with one embodiment, a display apparatus includes a plurality of sub-pixel groups, wherein at least one of the sub-pixel groups includes: a plurality of first sub-pixels configured to emit a first color of light; a plurality of second sub-pixels configured to emit a second color of light; and a dummy pixel between the plurality of first sub-pixels and the plurality of second sub-pixels, the dummy pixel including a first dummy driving transistor to be connected to a first one or a second one of the first sub-pixels under different conditions and a second dummy driving transistor to be connected to a first one or a second one of the second sub-pixels under different conditions.

The first dummy driving transistor may be connected to the first one of the first sub-pixels when the first one of the first sub-pixels is defective, and to the second one of the first sub-pixels when the second one of the first sub-pixels is defective, and the second dummy driving transistor mayo be connected to the first one of the second sub-pixels when the first one of the second sub-pixels is defective, and to the second one of the second sub-pixels when the second one of the second sub-pixels is defective.

Each of the first sub-pixels includes a first light-emitting device may be configured to emit a first color of light and a first sub-pixel circuit that is detachably connected to the first light-emitting device, each of the second sub-pixels may include a second light-emitting device configured to emit a second color of light and a second sub-pixel circuit that is detachably connected to the second light-emitting device. The dummy pixel may include a dummy pixel circuit which includes the first dummy driving transistor to be connected to the first light-emitting device under different conditions and the second dummy driving transistor to be connected to the second light-emitting device under different conditions.

The first sub-pixel circuit may include a first driving transistor having an aspect ratio that is substantially equal to an aspect ratio of the first dummy driving transistor, and the second sub-pixel circuit may include a second driving transistor having an aspect ratio that is substantially equal to an aspect ratio of the second dummy driving transistor.

Each of the first sub-pixel circuit and the second sub-pixel circuit may include a switching transistor configured to transfer a data signal in response to a scan signal; a capacitor configured to charge up to a voltage corresponding to the transferred data signal; and the first driving transistor or the second driving transistor configured to transfer a driving current corresponding to a voltage charged in the capacitor to the first light-emitting device or the second light-emitting device.

The display apparatus may include a pair of first lines passing between the plurality of first sub-pixels and the plurality of second sub-pixels; and a pair of second lines passing between a pair of first sub-pixels among the plurality of first sub-pixels and between a pair of second sub-pixels among the plurality of second sub-pixels. The pair of first sub-pixels and the pair of second sub-pixels may be symmetrical to each other around the pair of second lines. The plurality of first sub-pixels and the plurality of second sub-pixels may be symmetrical to each other around the pair of first lines.

The dummy pixel circuit may include a dummy switching transistor which includes a first terminal to be connected to a first one or a second one of the pair of first lines under different conditions and a second terminal to be connected to a first one or a second one of the pair of second lines under different conditions.

When one of the pair of first sub-pixels or the pair of second sub-pixels is a defective sub-pixel, the defective sub-pixel may include a light-emitting device connected to the first dummy driving transistor or the second dummy driving transistor and a defective sub-pixel circuit separated from the light-emitting device.

The dummy switching transistor may include the first terminal connected to a first line connected to the defective sub-pixel circuit among the pair of first lines and the second terminal connected to a second line connected to the defective sub-pixel circuit among the pair of second lines.

The dummy pixel circuit may include a first dummy switching transistor including a first terminal to be connected to one of the pair of first lines and a second terminal to be connected a first one or a second one of the pair of second lines under different conditions; and a second dummy switching transistor including a first terminal to be connected to the other of the pair of first lines and a second terminal to be connected to the first one or the second one of the pair of second lines under different conditions.

The pair of first lines may include a first data line connected to the pair of first sub-pixels and a second data line connected to the pair of second sub-pixels, and the pair of second lines may include a first scan line connected to one of the pair of first sub-pixels and one of the pair of second sub-pixels and a second scan line connected to the other of the pair of first sub-pixels and the other of the pair of second sub-pixels.

The dummy pixel circuit may include a dummy switching transistor which includes a control terminal to be connected to the first scan line or the second scan line under different conditions, and a connection terminal to be connected to the first data line or the second data line under different conditions.

The dummy pixel circuit may include a first dummy switching transistor including a control terminal to be connected to either of the first scan line or the second scan line under different conditions and a connection terminal connected to the first data line; and a second dummy switching transistor including a control terminal to be connected to either of the first scan line or the second scan line under different conditions and a connection terminal connected to the second data line.

In accordance with another embodiment, an apparatus includes a dummy pixel; a first sub-pixel connected to a first data line; and a second sub-pixel connected to a second data line; wherein the dummy pixel is connected to the first sub-pixel under a first condition and the dummy pixel is connected to the second sub-pixel under a second condition. The first data line may be adjacent the second data line.

The first condition may be when the first sub-pixel is defective, and the second condition may be when the second sub-pixel is defective. The dummy pixel may be in a region located between the first and second sub-pixels. The first sub-pixel and the second sub-pixel may emit light of different colors.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
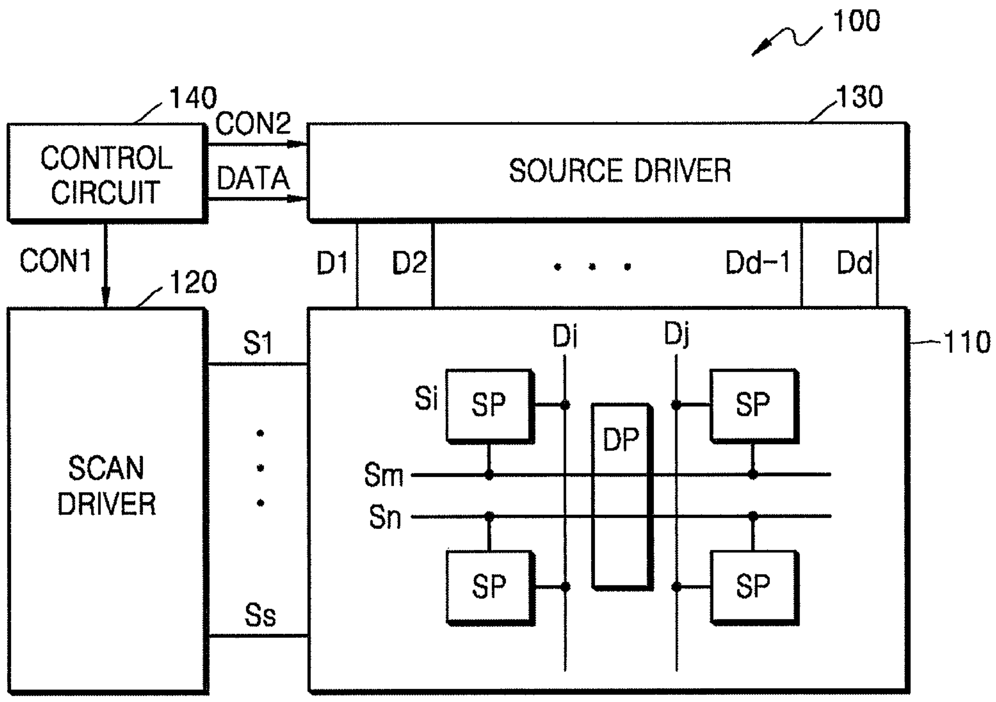
FIG. 1 illustrates an embodiment of a display apparatus.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing, regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "connectable" means capable of being connected using laser or another method in a repair process. For example, a first member is connectable to a second member when the first member is not connected to the second member actually, but the first member is in a state capable of being connected to the second member in the repair process. From a structural perspective, the first member and second member that are connectable to each other, for example, may intersect each other via an insulating film in an overlapping area, but this is not necessary in all embodiments. When laser is radiated onto the overlapping area in the repair process, the insulating film is destroyed and the first member and the second member are electrically connected to each other.

As used herein, the term "detachably" means capable of being separated using laser or another method in a repair process. For example, a first member is detachably connected to a second member when the first member is connected to the second member actually, but the first member is in a state capable of being separated from the second member in the repair process. From a structural perspective, the first member and second member that are detachably connected to each other may, for example, intersect each other through a conductive coupling member. When laser is radiated onto the conductive coupling member in the repair process, a portion onto which the laser is radiated is melted and the conductive coupling member is cut off. Therefore, the first member and the second member are electrically insulated from each other. In one example embodiment, the conductive coupling member may include a silicon layer which may be melted by a laser. In another example embodiment, the conductive coupling member may be melted by Joule heat due to current and then cut off.

FIG. 1 illustrates an embodiment of a display apparatus 100 which includes a panel 110, a scan driver 120, a source driver 130, and a control circuit 140. The scan driver 120, the source driver 130, and the control circuit 140 may be formed in respective semiconductor chips or may be integrated in one semiconductor chip. The scan driver 120 may be formed on a same substrate as a display panel 200.

The panel 110 includes a plurality of data lines D1 to Dd, a plurality of scan lines S1 to Ss (d=s or d≠s), a plurality pixels including sub-pixels SP, and dummy pixels including a dummy pixel DP between adjacent sub-pixels SP. The sub-pixels SP are respectively connected to the data lines D1 to Dd and the scan lines S1 to Ss. The sub-pixel SP may include a sub-pixel circuit and a display device that is detachably connected to the sub-pixel circuit.

The panel 110 may be a flat display panel, e.g., an organic light-emitting diode display panel, a thin film transistor liquid crystal display panel, a plasma display panel, or a light-emitting diode display panel. The display device may include an organic emission layer or a liquid crystal layer. The display device may be referred to as a light-emitting device when the display device includes the organic emission layer. The present embodiment is described below under the assumption that the panel 110 is an organic light-emitting display panel. The display apparatus 100 may also be referred to as an organic light-emitting display apparatus 100.

The dummy pixel DP may be between a predetermined number (e.g., at least two) of the sub-pixels SP. In one embodiment, the predetermined number may be 4 or more. The predetermined number of sub-pixels SP and the dummy pixel DP may constitute a sub-pixel group.

The panel 110 may include a plurality of unit pixels, each including a predetermined number of sub-pixels SP. The plurality of unit pixels may be arranged in a matrix on the panel 110.

The control circuit 140 may generate a plurality of control signals that include a first control signal CON1 and a second control signal CON2. For example, the control circuit 140 may generate the first control signal CON1, the second control signal CON2, and digital image data DATA based on a horizontal synchronization signal and a vertical synchronization signal. The control circuit 140 may control application of a first driving voltage ELVDD, a second driving voltage ELVSS, a light emission control signal EM, and/or an initialization voltage Vint to the sub-pixels SP.

The scan driver 120 may sequentially drive the scan lines S1 to Ss in response to the first control signal CON1. For example, the first control signal CON1 may be an instruction signal for instructing the scan driver 120 to start to scan the scan lines S1 to Ss. The scan driver 120 may generate scan signals and sequentially provide the scan signals to the sub-pixels SP through the scan lines S1 to Ss.

The source driver 130 may drive the data lines D1 to Dd in response to the second control signal CON2 and digital image data DATA, which may be provided by the control circuit 140. The source driver 130 may convert the digital image data DATA having gradation to data signals having relevant gradation voltages. The data signals may be sequentially provided to the sub-pixels SP via the data lines D1 to Dd.

Figure 2:
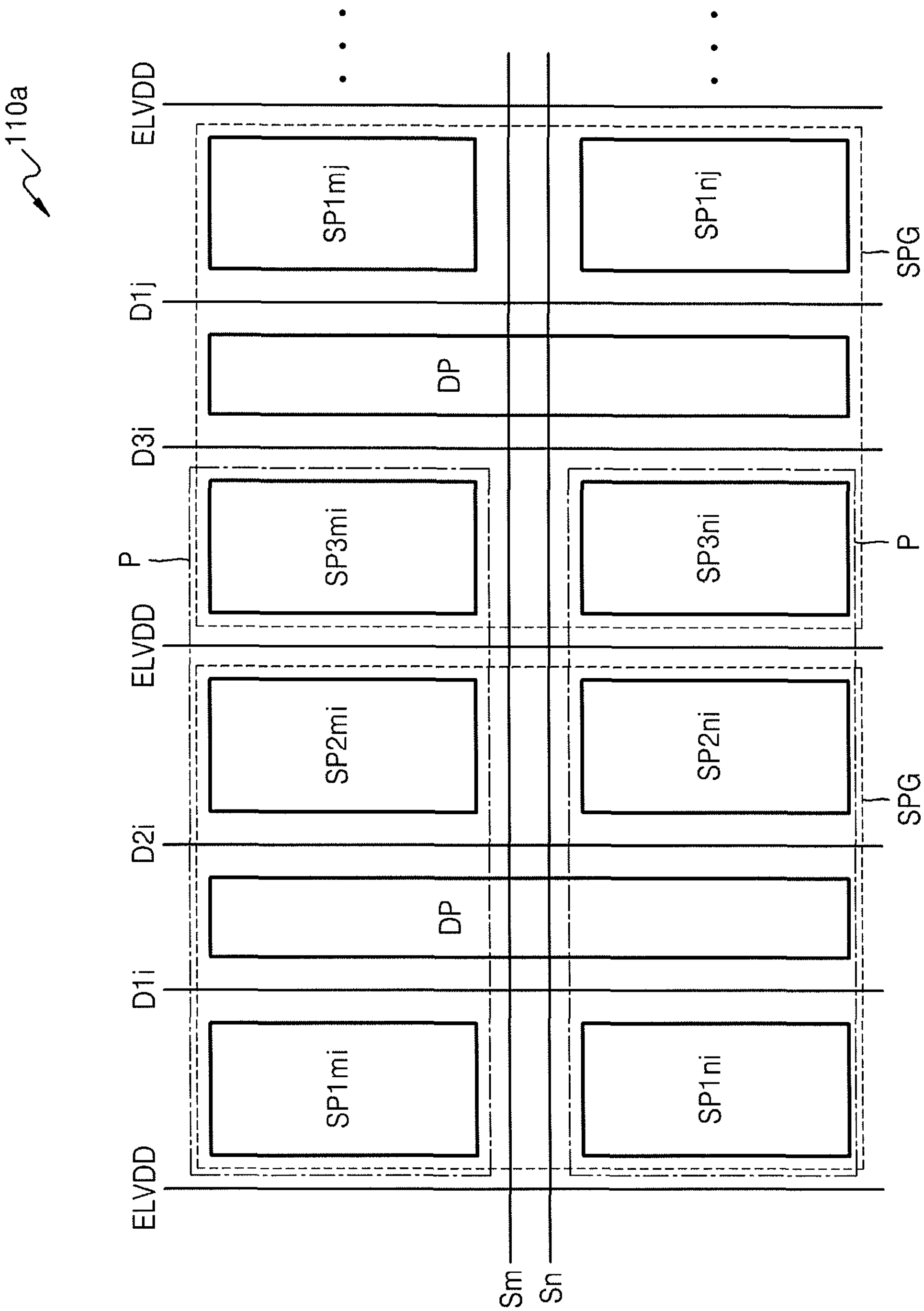
FIG. 2 illustrates an embodiment of a portion of a display panel.

FIG. 2 illustrates an embodiment of a portion 110*a* of a display panel. Referring to FIG. 2, a plurality of sub-pixel groups SPG are illustrated. The sub-pixel groups SPG respectively include a plurality of sub-pixels (e.g., SP1*mi*, SP1*ni*, SP2*mi*, and SP2*ni*) and one dummy pixel DP. The sub-pixels (e.g., SP1*mi*, SP1*ni*, SP2*mi*, and SP2*ni*) may be referred to as sub-pixels SP.

The number of sub-pixels SP in one sub-pixel group SPG may be, for example, 4. In other embodiments, the number of sub-pixels SP in one sub-pixel group SPG may be greater than 4. For example, one sub-pixel group SPG may include six or eight sub-pixels SP. For illustrative purposes, the following embodiment is described as having four sub-pixels SP in each sub-pixel group SPG.

The sub-pixels SP in the sub-pixel groups SPG may include a plurality of first sub-pixels (e.g., SP1*mi* and SP1*ni*) that emit a first color of light and a plurality of second sub-pixels (e.g., SP2*mi* and SP2*ni*) that emit a second color of light. The dummy pixel DP is between the plurality of first sub-pixels SP1*mi* and SP1*ni* and the plurality of second sub-pixels SP2*mi* and SP2*ni*.

The sub-pixels (e.g., SP1*mi*, SP2*mi*, and SP3*mi*) may constitute a unit pixel P. For example, as illustrated in FIG. 2, the unit pixel P may include three sub-pixels SP1*mi*, SP2*mi*, and SP3*mi* that respectively emit a first color of light (red), a second color of light (green), and a third color of light (blue). In another embodiment, the unit pixel may include four sub-pixels that respectively emit a first color of light (red), a second color of light (green), a third color of light (blue), and a fourth color of light (white). In other embodiments, a different combination of colors of light may be emitted.

The sub-pixel groups SPG may be arranged in a matrix on the panel 100*a*. For example, when the unit pixel P includes the three sub-pixels SP1*mi*, SP2*mi*, and SP3*mi* that respectively emit a first color of light, a second color of light, and a third color of light, the sub-pixel groups SPG may include first to third sub-pixel groups SPG adjacent to one another and in a repeating pattern.

For example, the first sub-pixel groups SPG, the second sub-pixel groups SPG, and the third sub-pixel groups SPG may be disposed in a repeating pattern in a first direction. The first sub-pixel groups SPG may be arranged continuously in a second direction. The second sub-pixel groups SPG and the third sub-pixel groups SPG may also be arranged continuously in the second direction. The first direction may be a direction in which first lines (e.g., D1*i*, D2*i*, D3*i*, and D1*j*) extend, and the second direction may be a direction in which second lines (e.g., Sm and Sn) extend, or vice versa. The following description is given under the assumption that the first direction is the direction in which the first lines (D1*i*, D2*i*, D3*i*, and D1*j*) extend, and the second direction is the direction in which the second lines (Sm and Sn) extend.

The first sub-pixel group SGP may include a plurality of first sub-pixels SP1*mi* and SP1*ni* that emit the first color of light and a plurality of second sub-pixels SP2*mi* and SP2*ni* that emit the second color of light. The second sub-pixel group SGP may include a plurality of third sub-pixels SP3*mi* and SP3*ni* that emit the third color of light and the plurality of first sub-pixels SP1*mi* and SP1*ni* that emit the first color of light. The third sub-pixel group SGP may include the plurality of second sub-pixels SP2*mi* and SP2*ni* that emit the second color of light and the plurality of third sub-pixels SP3*mi* and SP3*ni* that emit the third color of light. The first to third colors may be for example, red, green, and blue.

When the unit pixel P includes four sub-pixels SP that respectively emit a first color of light, a second color of light, a third color of light, and a fourth color of light, the sub-pixel groups may include first and second sub-pixel groups SPG adjacent to one another and in a repeating pattern. For example, the first sub-pixel groups SPG and the second sub-pixel groups SPG may be disposed in a repeating pattern in a first direction. The first sub-pixel groups SPG may be arranged continuously in a second direction, and the second sub-pixel groups may also be arranged continuously in the second direction.

The first sub-pixel group SGP may include a plurality of first sub-pixels SP1*mi* and SP1*ni* that emit the first color of light and a plurality of second sub-pixels SP2*mi* and SP2*ni* that emit the second color of light. The second sub-pixel group SGP may include a plurality of third sub-pixels SP3*mi* and SP3*ni* that emit the third color of light and a plurality of fourth sub-pixels that emit the fourth color of light. The first to fourth colors may be, for example, red, green, blue, and white.

As illustrated in FIG. 2, one sub-pixel group SGP may include a pair of first sub-pixels SP1*mi* and SP1*ni* and a pair of second sub-pixels SP2*mi* and SP2*ni*. The panel 110*a* may include a pair of first lines D1*i* and D2*i* which extend in a first direction between the pair of first sub-pixels SP1*mi* and SP1*ni* and the pair of second sub-pixels SP2*mi* and SP2*ni*. The pair of first sub-pixels SP1*mi* and SP1*ni* and the pair of second sub-pixels SP2*mi* and SP2*ni* may be disposed symmetrically around the pair of first lines D1*i* and D2*i*.

The panel 110*a* may include a pair of second lines Sm and Sn which extend in a second direction between the pair of first sub-pixels SP1*mi* and SP1*ni* and the pair of second sub-pixels SP2*mi* and SP2*ni*. The pair of first sub-pixels SP1*mi* and SP1*ni* may be disposed symmetrically around the pair of second lines Sm and Sn. In addition, the pair of second sub-pixels SP2*mi* and SP2*ni* may be also disposed symmetrically around the pair of second lines Sm and Sn.

The dummy pixel DP may be between the pair of first lines D1*i* and D2*i* to overlap the pair of second lines Sm and Sn, as illustrated in FIG. 2. In another embodiment, the dummy pixel DP may be between the pair of second lines Sm and Sn to overlap the pair of first lines D1*i* and D2*i*. The pair of first lines D1*i* and D2*i* are adjacent to each other, and the pair of second lines Sm and Sn are adjacent to each other. The dummy pixel DP is adjacent to the pair of first lines D1*i* and D2*i* and the pair of second lines Sm and Sn.

Therefore, the length of a repair line extending from the dummy pixel DP to a display device corresponding to a defective sub-pixel for repair is short. Accordingly, the parasitic capacitance of a repaired sub-pixel is not largely different from that of a normal sub-pixel. As a result, degradation in the image quality of the repaired sub-pixel (e.g., due to RC delay) may be reduced or eliminated.

The pair of first lines D1*i* and D2*i* may be data lines driven by the source driver (130 of FIG. 1). The pair of second lines Sm and Sn may be scan lines driven by the scan driver (120 of FIG. 1). In another embodiment, the pair of first lines D1*i* and D2*i* may be scan lines driven by the scan driver (120 of FIG. 1), and the pair of second lines Sm and Sn may be data lines driven by the source driver (130 of FIG. 1). The following description is given under the assumption that the pair of first lines D1*i* and D2*i* are data lines and the pair of second lines Sm and Sn are scan lines.

As illustrated in FIG. 1, the panel 100*a* includes a plurality of first lines including the first lines D1*i*, D2*i*, D3*i*, and D1*j* and a plurality of second lines including the second lines Sm and Sn. The first lines D1*i*, D2*i*, D3*i*, and D1*j* may correspond to some of the data lines D1 to Dd illustrated in FIG. 1, and the second lines Sm and Sn may correspond to some of the scan lines S1 to Ss illustrated in FIG. 1. The first lines D1*i*, D2*i*, D3*i*, and D1*j* may be referred to as data lines D1*i*, D2*i*, D3*i*, and D1*j*, and the second lines Sm and Sn may be referred to as scan lines Sm and Sn.

Figure 3A:
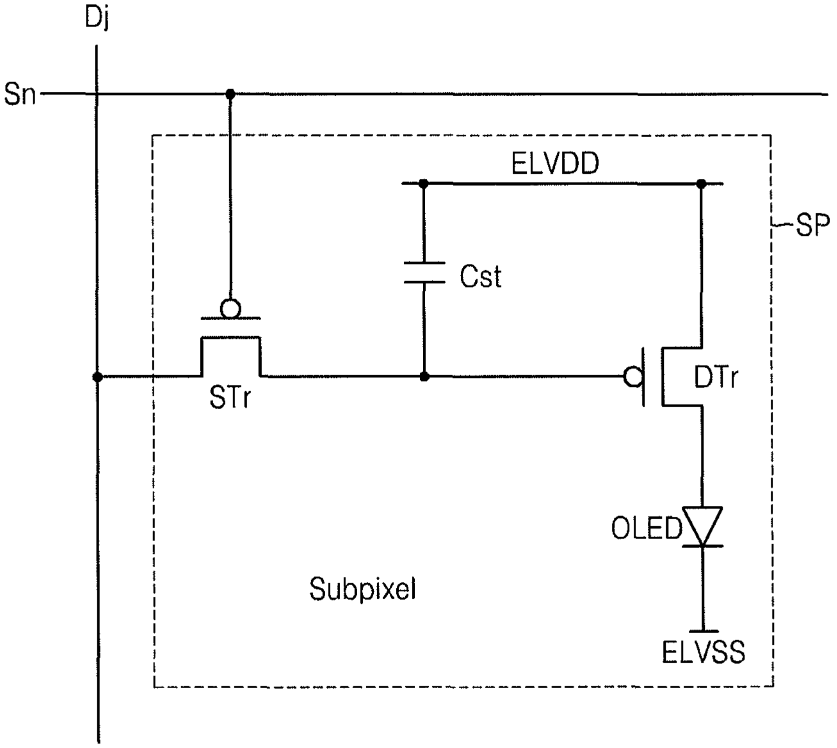
FIGS. 3A to 3C illustrate embodiments of sub-pixels.
Figure 3B:
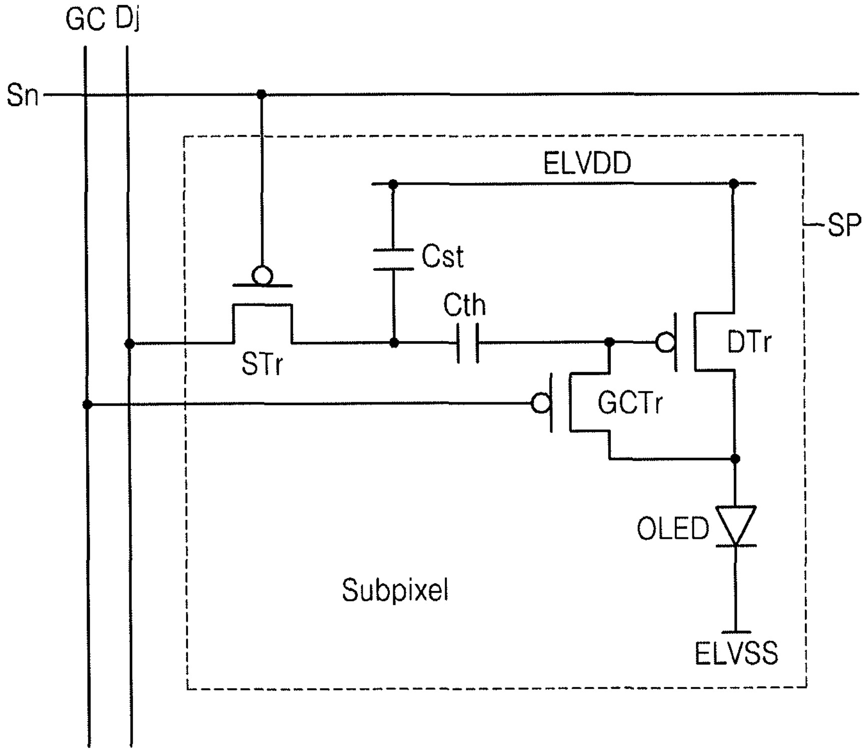
Figure 3C:
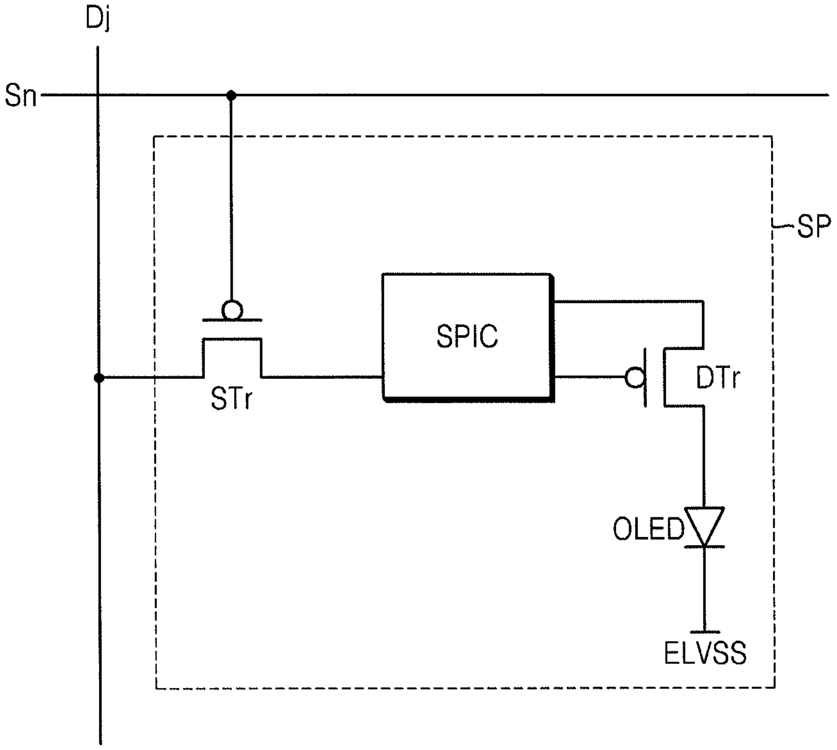

FIGS. 3A to 3C illustrate embodiments of sub-pixels, which, for example, may correspond to the sub-pixels SP in FIGS. 1 and 2.

Referring to FIG. 3A, the sub-pixel SP may include a sub-pixel circuit and a light-emitting device OLED. In the sub-pixel SP illustrated in FIG. 3A, the sub-pixel circuit includes a switching transistor Str, a driving transistor DTr, and a storage capacitor Cst. In FIG. 3A, the switching transistor STr and the driving transistor DTr are illustrated as p-channel metal oxide semiconductor (PMOS) transistors. However, in other embodiments, n-channel metal oxide semiconductor (NMOS) transistors may be used.

The switching transistor STr is connected to a scan line Sn and a data line Dj. The switching transistor STr includes a control terminal connected to the scan line Sn, a first connection terminal connected to the data line Dj, and a second connection terminal connected in common to a control terminal of the driving transistor DTr and a first electrode of the storage capacitor Cst. The control terminal is the gate of the transistor, and the first and second connection terminals are the source or drain of the transistor. A first driving voltage ELVDD is applied to a second electrode of the storage capacitor Cst and the first connection terminal of the driving transistor DTr. A second connection terminal of the driving transistor DTr is connected to an anode of the light-emitting device OLED. A second driving voltage ELVSS is applied to a cathode of the light-emitting device OLED.

The switching transistor STr transfers a data signal from a data driver (130 of FIG. 1), via the data line Dj, to the storage capacitor Cst in response to a scan signal from a scan driver (120 of FIG. 1) via the scan line Sn. The storage capacitor Cst charges up to a voltage corresponding, to the transferred data signal. The driving transistor DTr transfers a driving current corresponding to a voltage charged in the storage capacitor Cst to the light-emitting device OLED. The light-emitting device OLED emits light with a brightness corresponding to the data signal based on the driving current.

Referring to FIG. 3B, sub-pixel SP includes a switching transistor Str, a control transistor GCTr, a driving transistor DTr, a storage capacitor Cst, and a compensation capacitor Cth. A panel including the sub-pixels SP in FIG. 3B further includes a global control line GC. The global control line GC is connected to a control terminal of a control transistor GCTr. The control transistor GCTr includes first and second connection terminals respectively connected to a control terminal and a second connection terminal of the driving transistor DTr. The compensation capacitor Cth is connected between a first terminal of the storage capacitor Cst and the control terminal of the driving transistor DTr.

Referring to FIG. 3C, the sub-pixel SP includes a sub-pixel circuit and a light-emitting device OLED that is detachably connected to the sub-pixel circuit. The sub-pixel circuit includes a switching transistor STr, a driving transistor DTr, and a sub-pixel internal circuit SPIC.

The sub-pixel internal circuit SPIC may include at least one capacitor. In one embodiment, the sub-pixel internal circuit SPIC may correspond to the sub-pixels in FIG. 3A or 3B. In the case of the sub-pixel SP in FIG. 3A, the sub-pixel internal circuit SPIC includes a storage capacitor Cst. In the case of the sub-pixel in FIG. 3B, the sub-pixel internal circuit SPIC includes the storage capacitor Cst, the compensation capacitor Cth, and the control transistor GCTr. The sub-pixel internal circuit SPIC may be modified according to the design of the sub-pixels. In the following description, the sub-pixel SP is represented as the sub-pixel SP including the sub-pixel internal circuit SPIC, as illustrated in FIG. 3C.

Figure 4:
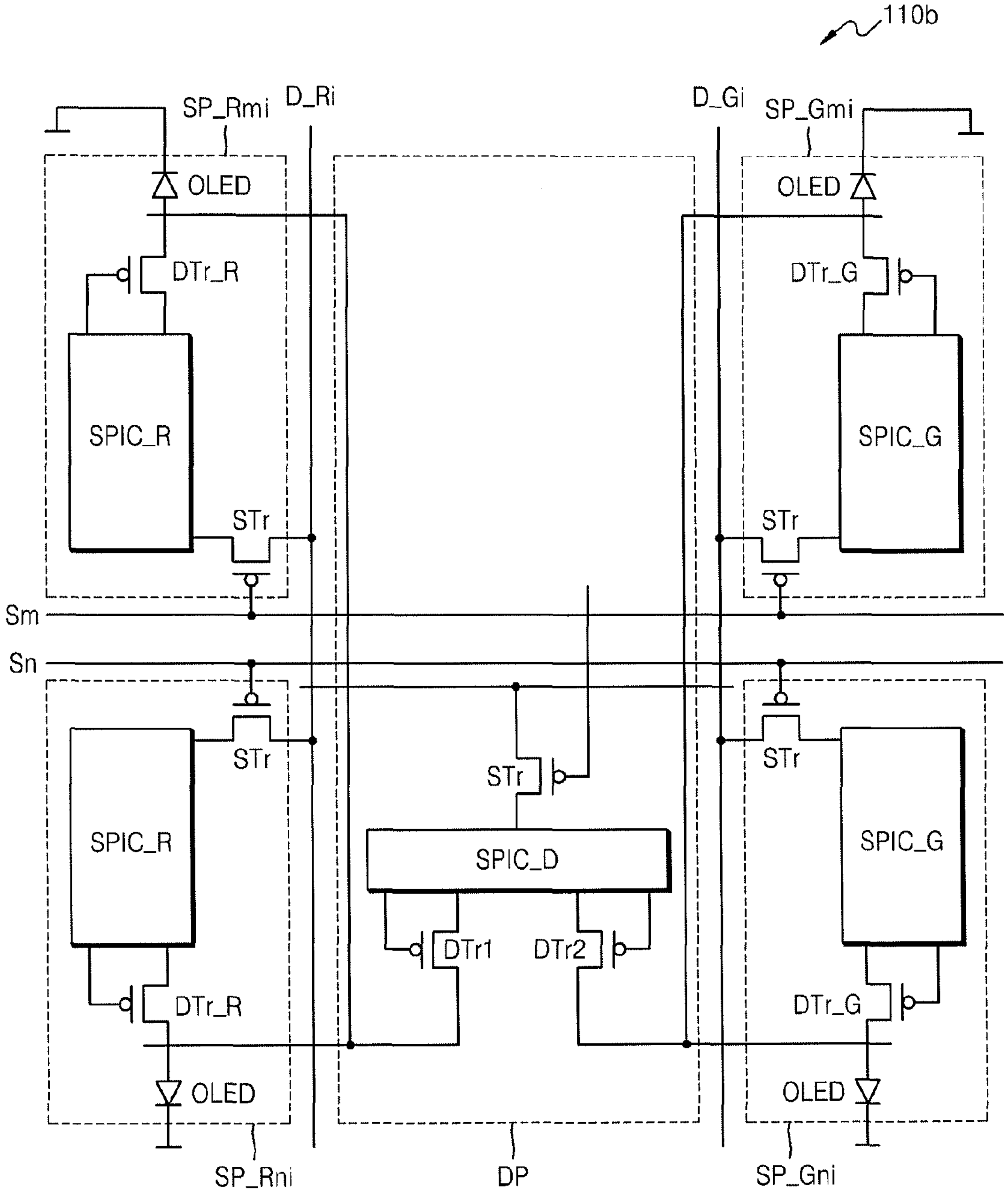
FIG. 4 illustrates another embodiment of a portion of a display panel.

FIG. 4 illustrates a portion of a panel 110B for an organic light-emitting display apparatus according to another embodiment. Referring to FIG. 4, the panel 110B includes first to fourth sub-pixels SP_Rmi, SP_Gmi, SP_Rni, and SP_Gni, and a dummy pixel DP. The first sub-pixel SP_Rmi and the third sub-pixel SP_Rni may emit a first color of light (e.g., red), and the second sub-pixel SP_Gmi and the fourth sub-pixel SP_Gni may emit a second color of light (e.g., green).

Each of the first sub-pixel SP_Rmi and the third sub-pixel SP_Rni includes a first light-emitting device OLED that emits the first color of light and a first sub-pixel circuit that is detachably connected to the first light-emitting device OLED. The first sub-pixel circuit includes a first driving transistor DTr_R having a first aspect ratio suitable to drive the first light-emitting device OLED that emits the first color of light. The aspect ratio may correspond, for example, to the ratio of the width to the length of a channel in a transistor.

Each of the second sub-pixel SP_Gmi and the fourth sub-pixel SP_Gni includes a second light-emitting device OLED that emits the second color of light and a second sub-pixel circuit that is detachably connected to the second light-emitting device OLED. The second sub-pixel circuit includes a second driving transistor DTr_G having a second aspect ratio suitable to drive the second light-emitting device OLED that emits the second color of light. The second aspect ratio may be different from the first aspect ratio.

The dummy pixel DP is located among the first to fourth sub-pixels SP_Rmi, SP_Gmi, SP_Rni, and SP_Gni. The dummy pixel DP includes a first dummy driving transistor DTr1 connectable to the first light-emitting devices OLED of the first sub-pixel SP_Rmi and the third sub-pixel SP_Rni, and a second dummy driving transistor DTr2 connectable to the second light-emitting devices OLED of the second sub-pixel SP_Gmi and the fourth sub-pixel SP_Gni.

The first dummy driving transistor DTr1 may have a third aspect ratio suitable to drive the first light-emitting device OLED that emits the first color of light. The third aspect ratio may be identical to the first aspect ratio.

The second dummy driving transistor DTr2 may have a fourth aspect ratio suitable to drive the second light-emitting device OLED that emits the second color of light. The fourth aspect ratio may be identical to the second aspect ratio.

Either of the first dummy driving transistor DTr1 or the second dummy driving transistor DTr2 may be connected to one of the first to fourth sub-pixels SP_Rmi, SP_Gmi, SP_Rni, and SP_Gni. When the first dummy driving transistor DTr1 is connected to the first sub-pixel SP_Rmi or the third sub-pixel SP_Rni, the second dummy driving transistor DTr2 is not connected to the second sub-pixel SP_Gmi and the fourth sub-pixel SP_Gni. On the contrary, when the second dummy driving transistor DTr2 is connected to the second sub-pixel SP_Gmi or the fourth sub-pixel SP_Gni, the first dummy driving transistor DTr1 is not connected to the first sub-pixel SP_Rmi and the third sub-pixel SP_Rni.

In addition, the first dummy driving transistor DTr1 may be connected to the first sub-pixel SP_Rmi or the third sub-pixel SP_Rni. The second dummy driving transistor DTr2 may be connected to the second sub-pixel SP_Gmi or the fourth sub-pixel SP_Gni.

The panel 110*b* may further include a first scan line Sm and a second scan line Sn, which pass between the first sub-pixel SP_Rmi and the third sub-pixel SP_Rni and between the second sub-pixel SP_Gmi and the fourth sub-pixel SP_Gni. The panel 110*b* may further include a first data line D_Ri and a second data line D_Gi, which pass between the first sub-pixel SP_Rmi and the second sub-pixel SP_Gmi and between the third sub-pixel SP_Rni and the fourth sub-pixel SP_Gni.

The first sub-pixel SP_Rmi may include a switching transistor STr having a control terminal connected to the first scan line Sm and a first connection terminal connected to the first data line D_Ri. According to one embodiment, the control terminal of the first sub-pixel SP_Rmi may be detachably connected to the first scan line Sm and the first connection terminal of the first sub-pixel SP_Rmi may be detachably connected to the first data line D_Ri.

The second sub-pixel SP_Gmi may include a switching transistor STr having a control terminal connected to the first scan line Sm and a first connection terminal connected to the second data line D_Gi. According to one embodiment, the control terminal of the second sub-pixel SP_Rmi may be detachably connected to the first scan line Sm and the first connection terminal of the second sub-pixel SP_Gmi may be detachably connected to the second data line D_Gi.

The third sub-pixel SP_Rni may include a switching transistor STr having a control terminal connected to the second scan line Sn and a first connection terminal connected to the first data line D_Ri. According to one embodiment, the control terminal of the third sub-pixel SP_Rni may be detachably connected to the second scan line Sn and the first connection terminal of the third sub-pixel SP_Rni may be detachably connected to the first data line D_Ri.

The fourth sub-pixel SP_Gni may include a switching transistor STr having a control terminal connected to the second scan line Sn and a first connection terminal connected to the second data line D_Gi. According to one embodiment, the control terminal of the fourth sub-pixel SP_Gni may be detachably connected to the second scan line Sn and the first connection terminal of the fourth sub-pixel SP_Gni may be detachably connected to the second data line D_Gi.

The dummy pixel DP may include a dummy switching transistor STr having a control terminal connectable to the first scan line Sm and the second scan line Sn, and a first connection terminal connectable to the first data line D_Ri and the second data line D_Gi. The control terminal of the dummy switching transistor STr may be connected to either of the first scan line Sm or the second scan line Sn. The first connection terminal of the dummy switching transistor STr may be connected to either of the first data line D_Ri or the second data line D_Gi.

The first sub-pixel SP_Rmi and the third sub-pixel SP_Rni may include a first sub-pixel internal circuit SPIC_R connected to its switching transistor STr and first driving transistor DTr_R.

The second sub-pixel SP_Gmi and the fourth sub-pixel SP_Gni may include a second sub-pixel internal circuit SPIC_G connected to its switching transistor STr and second driving transistor DTr_G. The second sub-pixel internal circuit SPIC_G may be identical to the first sub-pixel internal circuit SPIC_R from a circuit perspective.

The dummy pixel DP may include a dummy sub-pixel internal circuit SPIC_D connected to the dummy switching transistor STr and the first and second dummy driving transistors DTr1 and DTr2. The dummy sub-pixel internal circuit SPIC_D may be identical to the first sub-pixel internal circuit SPIC_R or the second sub-pixel internal circuit SPIC_G from a circuit perspective.

Referring to FIG. 4, the first sub-pixel SP_Rmi and the third sub-pixel SP_Rni may be symmetrical to each other around the first and second scan lines Sm and Sn. In addition, the second sub-pixel SP_Gmi and the fourth sub-pixel SP_Gni may be symmetrical to each other around the first and second scan lines Sm and Sn. Around the first and second data lines D_Ri and D_Gi, the first sub-pixel SP_Rmi and the second sub-pixel SP_Gmi may be symmetrical to each other, and the third sub-pixel SP_Rni and the fourth sub-pixel SP_Gni may be symmetrical to each other.

The dummy pixel DP may be between the first and second data lines D_Ri and D_Gi. Therefore, the control terminal of the dummy switching transistor STr may be connected to one of the first scan line Sm or the second scan line Sn using relatively short connection wiring, and the first connection terminal of the dummy switching transistor STr may be connected to one of the first data line D_Ri or the second data line D_Gi using relatively short connection wiring. Because long repair wiring is not connected to a dummy pixel disposed in a perimeter area, no parasitic capacitance is formed of the type caused by the use of long repair wiring. As a result, even when a defective sub-pixel is repaired, there is no degradation in image quality, for example, due to a difference in RC delays.

Figure 5A:
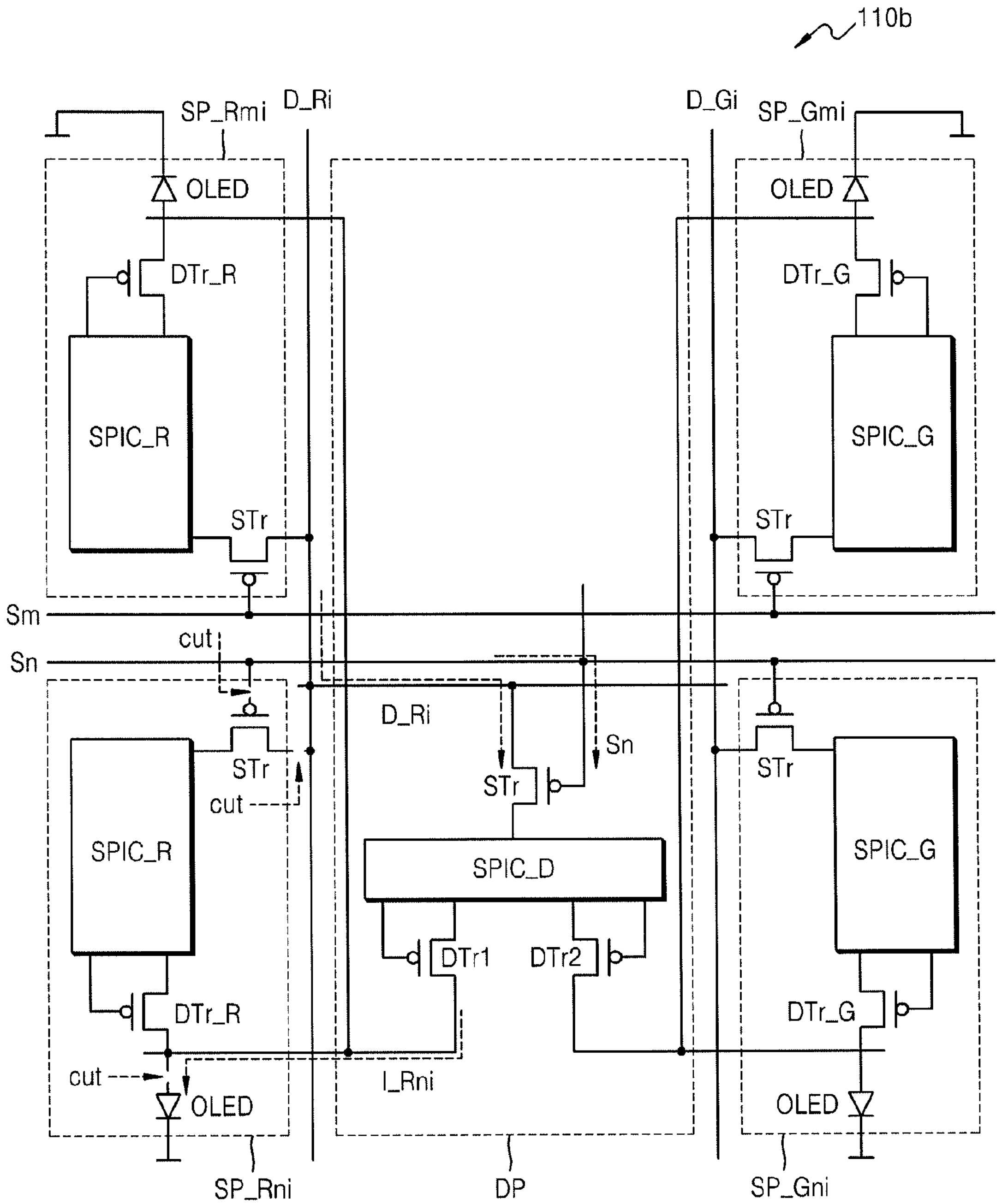
FIGS. 5A to 5C illustrate an embodiment of a method for repairing sub-pixels.
Figure 5B:
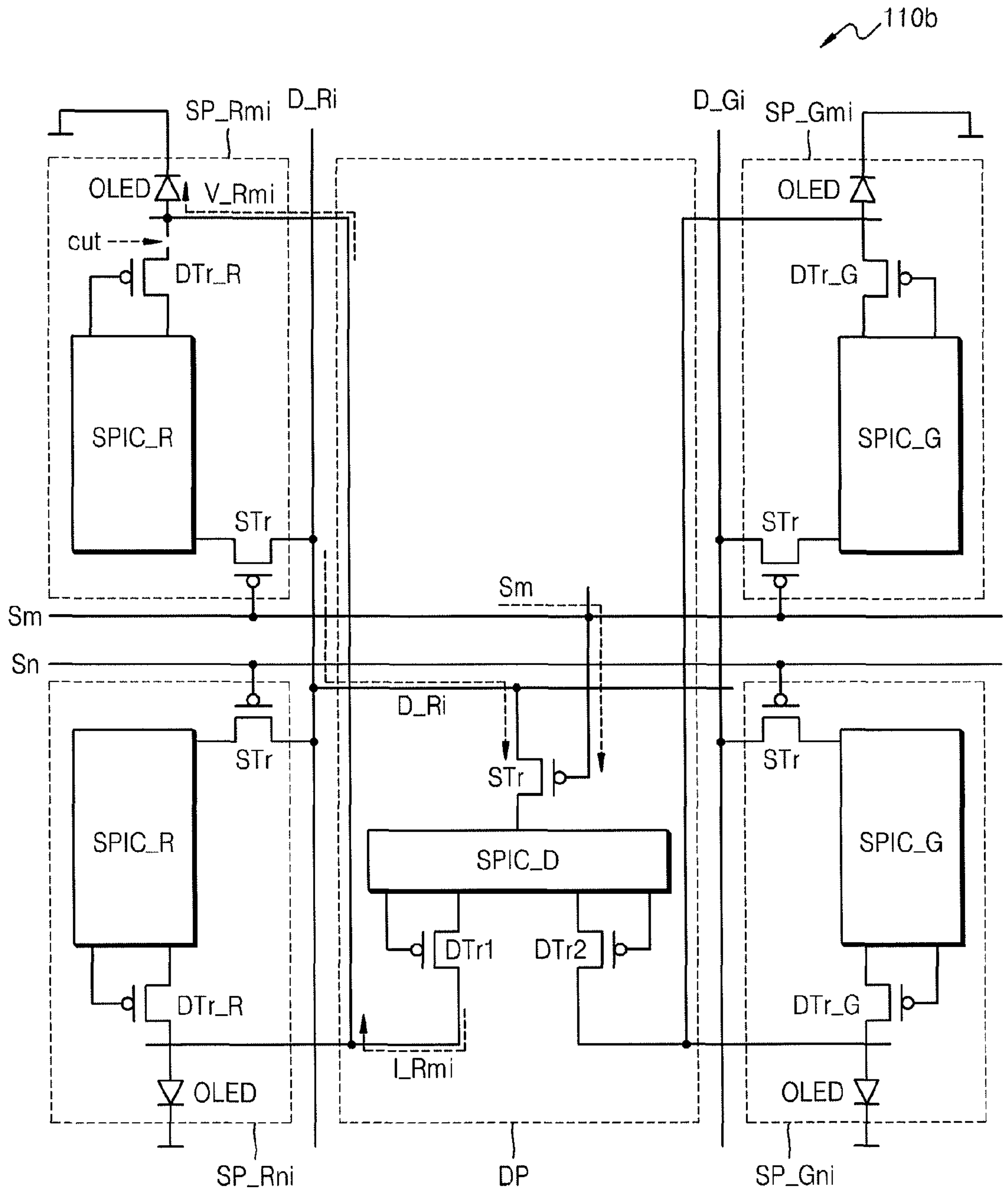
Figure 5C:
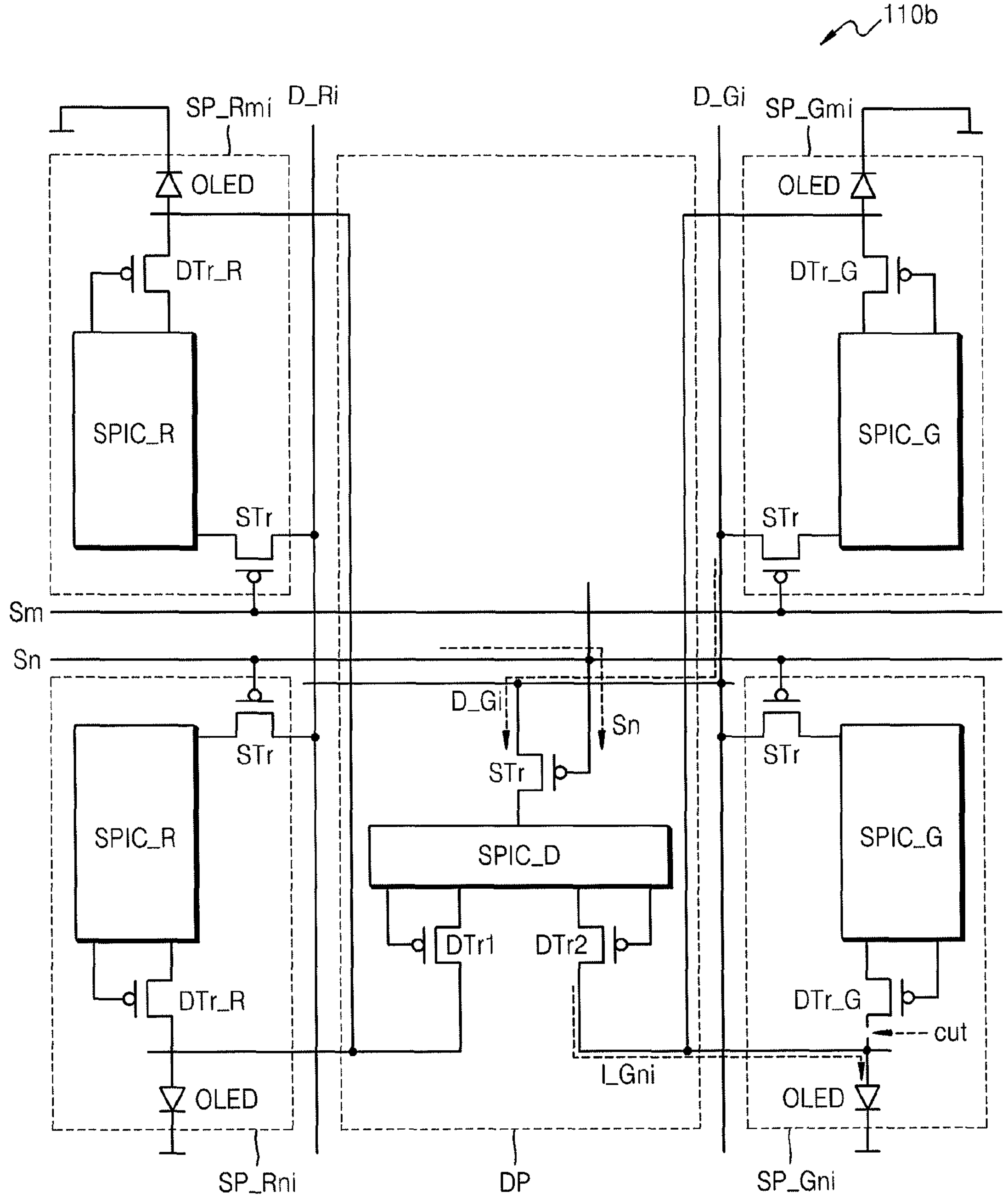

FIGS. 5A to 5C illustrate operations included in one embodiment of a method for repairing sub-pixels in the organic light-emitting display apparatus of FIG. 4.

FIG. 5A illustrates a third sub-pixel SP_Rni that has been repaired using a dummy pixel DP. In the third sub-pixel SP_Rni, a first driving transistor DTr_R and a first light-emitting device OLED are separated from each other. For example, when a laser is radiated onto a wiring connecting a second connection terminal of the first driving transistor DTr_R to an anode of the first light-emitting device OLED, the wiring is cut off and the first driving transistor DTr_R and the first light-emitting device OLED are insulated from each other.

The first light-emitting device OLED is connected to a first dummy driving transistor DTr1 of the dummy pixel DP. For example, when a laser is radiated onto a portion at which a wiring connected to the anode of the first light-emitting device OLED and a wiring connected to a second connection terminal of the first dummy driving transistor DTr1 overlap each other, the first light-emitting device OLED and the first dummy driving transistor DTr1 may be electrically connected to each other.

A dummy switching transistor STr of the dummy pixel DP is connected to the second scan line Sn and the first data line D_Ri. A control terminal of the dummy switching transistor STr may be connected to the second scan line Sn, for example, using a laser. In addition, a first connection terminal of the dummy switching transistor STr is connected to the first data line D_Ri, for example, using a laser.

The dummy switching transistor STr of the dummy pixel DP transfers a data signal, provided through the first data line D_Ri, to a dummy sub-pixel internal circuit SPIC_D in response to a scan signal provided through the second scan line Sn. The dummy sub-pixel internal circuit SPIC_D performs a charging operation based on a voltage corresponding to the data signal. The first dummy driving transistor DTr1 generates a driving current I_Rni corresponding to the charged voltage, and applies the driving current I_Rni to the first light-emitting device OLED of the third sub-pixel SP_Rni. The first light-emitting device OLED of the third sub-pixel SP_Rni emits a first color of light at a brightness corresponding to the data signal.

The dummy switching transistor STr may operate in the same manner as a switching transistor STr of the third sub-pixel SP_Rni. For example, the dummy switching transistor STr may receive the same data signal at the same timing as the switching transistor STr of the third sub-pixel SP_Rni. Therefore, there is no need for an additional timing or a memory and an algorithm for controlling the additional timing. Thus, an existing display driver may be used without modification.

According to one embodiment, the switching transistor STr of the third sub-pixel SP_Rni may be separated from the second scan line Sn. For example, the control terminal of the switching transistor STr may be insulated from the second scan line Sn using a laser cutting method.

According to another embodiment, the switching transistor STr of the third sub-pixel SP_Rni may be separated from the first data line D_Ri. For example, the first connection terminal of the switching transistor STr may be insulated from the first data line D_Ri using a laser cutting method.

According to another embodiment, the switching transistor STr of the third sub-pixel SP_Rni may be separated from the second scan line Sn and the first data line D_Ri. Because the sub-pixel circuit of the third sub-pixel SP_Rni is separated from the second scan line Sn and/or the first data line D_Ri, other sub-pixel circuits in the same row or column as the sub-pixel circuit may be prevented from being affected by the defect of the sub-pixel circuit. In addition, unnecessary power consumption caused by a defective sub-pixel circuit may be prevented.

Because the defective sub-pixel circuit is completely separated from other sub-pixel circuits, the repaired third sub-pixel SP_Rni may be identical to other sub-pixels from a circuit perspective. Thus, use of an additional compensation algorithm or structure is not required.

FIG. 5B illustrates a first sub-pixel SP_Rmi that has been repaired using a dummy pixel DP. In the first sub-pixel SP_Rmi, a first driving transistor DTr_R and a first light-emitting device OLED are separated from each other, for example, using a laser cutting method. The first light-emitting device OLED is connected to a first dummy driving transistor DTr1 of the dummy pixel DP, for example, using a laser.

In the dummy pixel DP, a control terminal of a dummy switching transistor STr is connected to the first scan line Sm. A first connection terminal of the dummy switching transistor STr is connected to the first data line D_Ri. The dummy switching transistor STr transfers a data signal, provided through the first data line D_Ri, to the dummy sub-pixel internal circuit SPIC_D in response to a scan signal provided through the first scan line Sm. The dummy sub-pixel internal circuit SPIC_D performs charging using a voltage corresponding to the data signal. The first dummy driving transistor DTr1 generates a driving current I_Rmi corresponding to the charged voltage, and applies the driving current to the first light-emitting device OLED of the first sub-pixel SP_R_mi. The first light-emitting device OLED of the first sub-pixel SP_Rmi emits a first color of light at a brightness corresponding to the data signal.

According to another embodiment, the switching transistor STr of the first sub-pixel SP_Rmi may be separated from the first scan line Sm and/or the first data line D_Ri, for example, using a laser cutting method.

FIG. 5C illustrates a fourth sub-pixel SP_Gni that has been repaired using a dummy pixel DP. In the fourth sub-pixel SP_Gni, a second driving transistor DTr_G and a second light-emitting device OLED are separated from each other, for example, using a laser cutting method. The second light-emitting device OLED is connected to a second dummy driving transistor DTr2 of the dummy pixel DP, for example, using a laser.

In the dummy pixel DP, a control terminal of a dummy switching transistor STr is connected to the second scan line Sn. A first connection terminal of the dummy switching transistor STr is connected to the second data line D_Gi. The dummy switching transistor STr transfers a data signal, provided through the second data line D_Gi, to a dummy sub-pixel internal circuit SPIC_D in response to a scan signal provided through the second scan line Sn. The dummy sub-pixel internal circuit SPIC_D performs a charging operation based on a voltage corresponding to the data signal. The second dummy driving transistor DTr2 generates a driving current I_Gni corresponding to the charged voltage and applies the driving current to the second light-emitting device OLED of the fourth sub-pixel SP_Gni. The second light-emitting device OLED of the fourth sub-pixel SP_Gni emits a second color of light at a brightness corresponding to the data signal.

Because the second light-emitting device OLED that emits the second color of light is driven by the second dummy driving transistor DTr2, which is suitable to drive the second light-emitting device OLED, a more exact color may be emitted.

According to one embodiment, the switching transistor STr of the fourth sub-pixel SP_Gni may be separated from the second scan line Sn and/or the second data line D_Gi, for example, using a laser cutting method.

Figure 6:
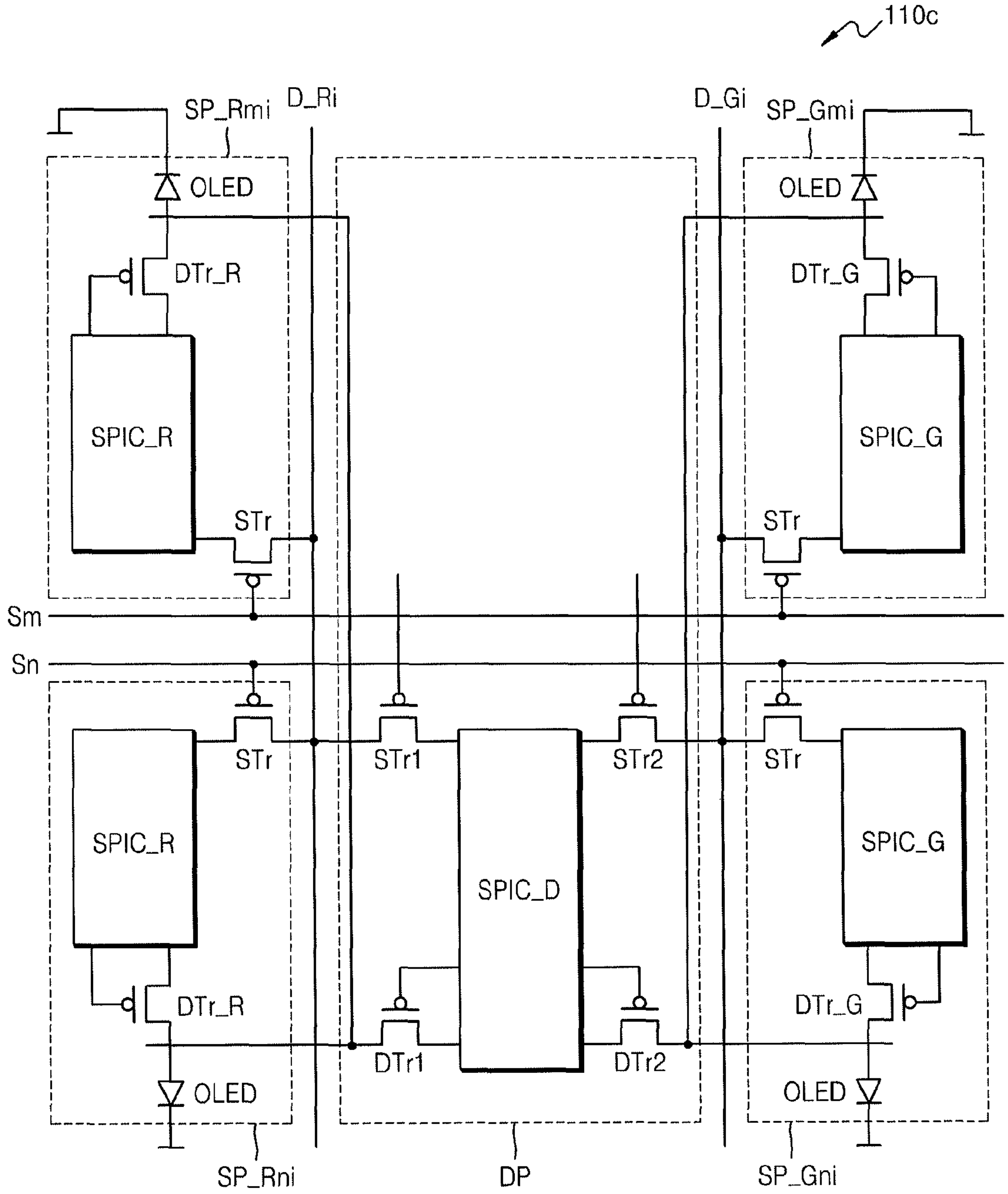
FIG. 6 illustrates another embodiment of a portion of a display panel.

FIG. 6 illustrates an embodiment of a portion of a panel 110*c* of an organic light-emitting display apparatus. Referring to FIG. 6, the panel 110*c* is substantially identical to the panel 110*b* in FIG. 4 except for a dummy pixel DP.

Unlike the dummy pixel DP of the panel 100*b*, a dummy pixel DP of the panel 100*c* includes first and second dummy switching transistors STr1 and STr2. The first dummy switching transistor STr1 includes a control terminal connectable to first and second scan lines Sm and Sn and a first connection terminal connected to a first data line DRi. The second dummy switching transistor STr2 includes a control terminal connectable to the first and second scan lines Sm and Sn and a first connection terminal connected to a second data line DGi.

The dummy pixel DP may receive a desired data signal in response to a desired scan signal, by connecting one of the first dummy switching transistor STr1 or the second dummy switching transistor STr2 to one of the first or second scan lines Sm and Sn using laser.

In a repair process, the dummy switching transistor STr of the panel 100*b* is connected to one of the first or second scan lines Sm and Sn and one of the first or second data lines D_Ri and D_Gi. In the dummy pixel DP of the panel 100*c* according to the present embodiment, one of the first or second dummy switching transistors STr1 and STr2 is connected to one of the first or second scan lines Sm and Sn. Thus, the number of connection processes is reduced by 1. For example, when using a laser, the number of laser radiations is reduced by 1. As a result, time and cost required for repair may be reduced.

Figure 7:
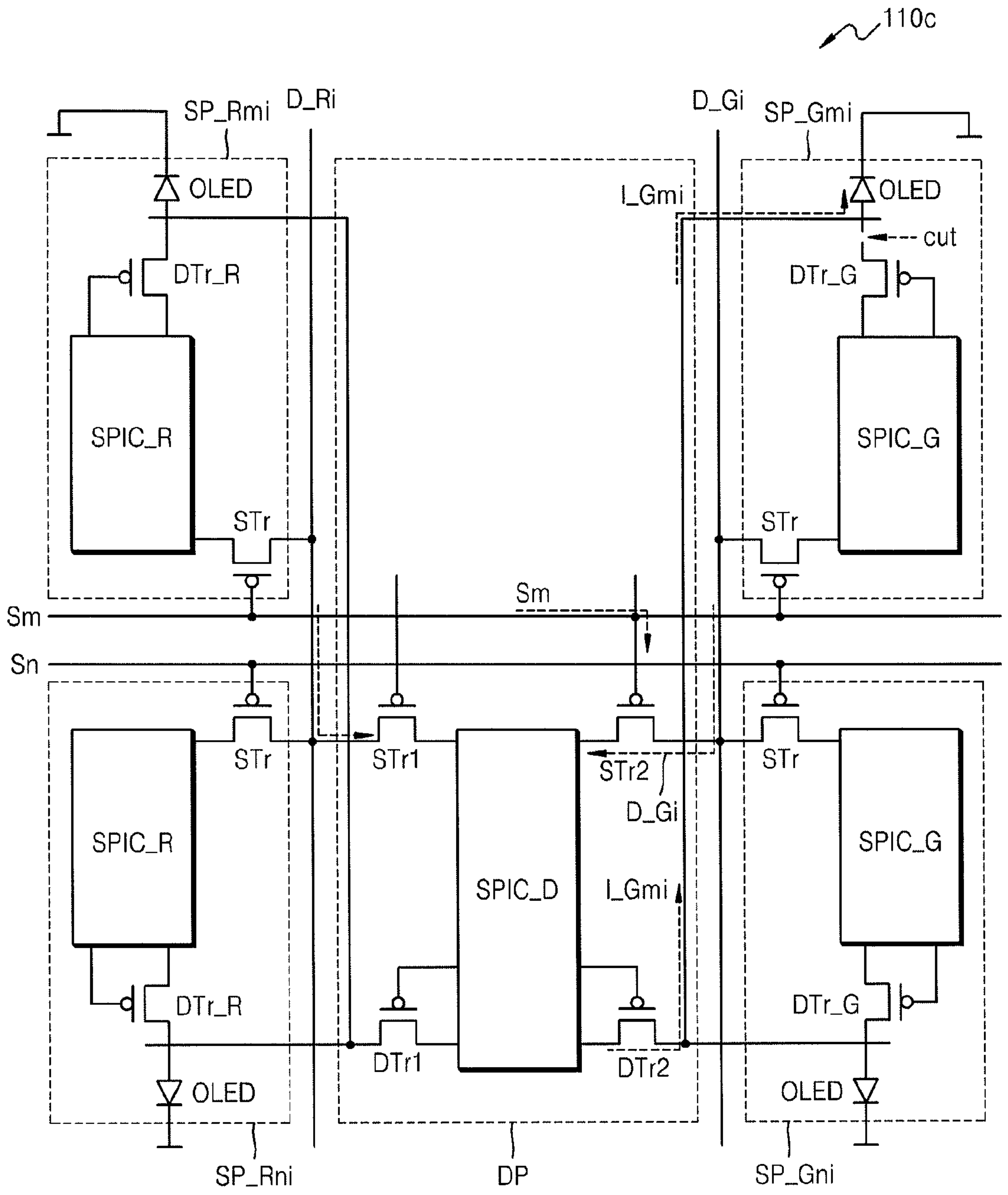
FIG. 7 illustrates another embodiment of a method for repairing sub-pixels.

FIG. 7 illustrates an embodiment of a method for repairing sub-pixels in the organic light-emitting display apparatus of FIG. 6. Referring to FIG. 7, a second sub-pixel SP_Gmi is illustrated as having been repaired using a dummy pixel DP. In the second sub-pixel SP_Gmi, a second driving transistor DTr_G and a second light-emitting device OLED are separated from each other, for example, using a laser cutting method. The second light-emitting device OLED is connected to a second dummy driving transistor DTr2 of the dummy pixel DP, for example, using a laser.

In the dummy pixel DP, a control terminal of a second dummy switching transistor STr2 is connected to a first scan line Sm.

The second dummy switching transistor STr2 transfers a data signal, provided through the second data line D_Gi, to a dummy sub-pixel internal circuit SPIC_D in response to a scan signal provided through the first scan line Sm. The dummy sub-pixel internal circuit SPIC_D performs a charging operation based on a voltage corresponding to the data signal. The second dummy driving transistor DTr2 generates a driving current I_Gmi corresponding to the charged voltage and applies the driving current to the second light-emitting device OLED of the second sub-pixel SP_Gmi. The second light-emitting device OLED of the second sub-pixel SP_Gmi emits a first color of light at a brightness corresponding to the data signal.

According to one embodiment, the switching transistor STr of the second sub-pixel SP_Gmi may be separated from the first scan line Sm and/or the second data line D_Gi, for example, using a laser cutting method.

By way of summation and review, attempts have been made to correct bright spot in a display panel. One approach involves changing the defective pixel to generate a dark spot. However, this approach does not repair the defective pixel to be a normal pixel, but merely changes the pixel from one defective state to another.

Another approach involves using a dummy pixel in an attempt to repair only a limited number of defective pixels. This approach requires an additional memory and timing to drive the dummy pixel. Also, an RC delay is generated due to a repair line. As a result of this delay, the time required to charge up to a low-gradation voltage is insufficient, thereby making it difficult to express a low-gradation image.

In accordance with one or more of the aforementioned embodiments, a display apparatus is provided which repairs a large number of defective pixels, while at the same time not generating RC delay. Thus, no modification to the display driver is required, which reduces costs and improves display quality.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A display apparatus, comprising:

a plurality of sub-pixel groups, wherein at least one of the sub-pixel groups includes:

a plurality of first sub-pixels to emit a first color of light;

a plurality of second sub-pixels to emit a second color of light; and a dummy pixel between the plurality of first sub-pixels and the plurality of second sub-pixels, the dummy pixel including a first dummy driving transistor to be connected to a first one or a second one of the first sub-pixels under different conditions and a second dummy driving transistor to be connected to a first one or a second one of the second sub-pixels under different conditions.

2. The display apparatus as claimed in claim 1, wherein:

the first dummy driving transistor is to be connected to the first one of the first sub-pixels when the first one of the first sub-pixels is defective, and to the second one of the first sub-pixels when the second one of the first sub-pixels is defective, and the second dummy driving transistor is to be connected to the first one of the second sub-pixels when the first one of the second sub-pixels is defective, and to the second one of the second sub-pixels when the second one of the second sub-pixels is defective.

3. The display apparatus as claimed in claim 1, wherein:

each of the first sub-pixels includes a first light-emitting device to emit a first color of light and a first sub-pixel circuit that is detachably connected to the first light-emitting device, each of the second sub-pixels includes a second light-emitting device to emit a second color of light and a second sub-pixel circuit that is detachably connected to the second light-emitting device, and the dummy pixel includes a dummy pixel circuit which includes the first dummy driving transistor to be connected to the first light-emitting device under different conditions and the second dummy driving transistor to be connected to the second light-emitting device under different conditions.

4. The display apparatus as claimed in claim 3, wherein:

the first sub-pixel circuit includes a first driving transistor having an aspect ratio that is substantially equal to an aspect ratio of the first dummy driving transistor, and the second sub-pixel circuit includes a second driving transistor having an aspect ratio that is substantially equal to an aspect ratio of the second dummy driving transistor.

5. The display apparatus as claimed in claim 4, wherein each of the first sub-pixel circuit and the second sub-pixel circuit includes:

a switching transistor to transfer a data signal in response to a scan signal;

a capacitor to charge up to a voltage corresponding to the transferred data signal; and the first driving transistor or the second driving transistor to transfer a driving current corresponding to a voltage charged in the capacitor to the first light-emitting device or the second light-emitting device.

6. The display apparatus as claimed in claim 3, further comprising:

a pair of first lines passing between the plurality of first sub-pixels and the plurality of second sub-pixels; and a pair of second lines passing between a pair of first sub-pixels among the plurality of first sub-pixels and between a pair of second sub-pixels among the plurality of second sub-pixels.

7. The display apparatus as claimed in claim 6, wherein the pair of first sub-pixels and the pair of second sub-pixels are symmetrical to each other around the pair of second lines.

8. The display apparatus as claimed in claim 6, wherein the plurality of first sub-pixels and the plurality of second sub-pixels are symmetrical to each other around the pair of first lines.

9. The display apparatus as claimed in claim 6, wherein the dummy pixel circuit includes a dummy switching transistor which includes a first terminal to be connected to a first one or a second one of the pair of first lines under different conditions and a second terminal to be connected to a first one or a second one of the pair of second lines under different conditions.

10. The display apparatus as claimed in claim 9, wherein:

when one of the pair of first sub-pixels or the pair of second sub-pixels is a defective sub-pixel, the defective sub-pixel includes a light-emitting device connected to the first dummy driving transistor or the second dummy driving transistor and a defective sub-pixel circuit separated from the light-emitting device.

11. The display apparatus as claimed in claim 10, wherein the dummy switching transistor includes the first terminal connected to a first line connected to the defective sub-pixel circuit among the pair of first lines and the second terminal connected to a second line connected to the defective sub-pixel circuit among the pair of second lines.

12. The display apparatus as claimed in claim 6, wherein the dummy pixel circuit includes:

a first dummy switching transistor including a first terminal to be connected to one of the pair of first lines and a second terminal to be connected a first one or a second one of the pair of second lines under different conditions; and a second dummy switching transistor including a first terminal to be connected to the other of the pair of first lines and a second terminal to be connected to the first one or the second one of the pair of second lines under different conditions.

13. The display apparatus as claimed in claim 6, wherein:

the pair of first lines includes a first data line connected to the pair of first sub-pixels and a second data line connected to the pair of second sub-pixels, and the pair of second lines includes a first scan line connected to one of the pair of first sub-pixels and one of the pair of second sub-pixels and a second scan line connected to the other of the pair of first sub-pixels and the other of the pair of second sub-pixels.

14. The display apparatus as claimed in claim 13, wherein the dummy pixel circuit includes a dummy switching transistor which includes a control terminal to be connected to the first scan line or the second scan line under different conditions, and a connection terminal to be connected to the first data line or the second data line under different conditions.

15. The display apparatus as claimed in claim 13, wherein the dummy pixel circuit includes:

a first dummy switching transistor including a control terminal to be connected to either of the first scan line or the second scan line under different conditions and a connection terminal connected to the first data line; and a second dummy switching transistor including a control terminal to be connected to either of the first scan line or the second scan line under different conditions and a connection terminal connected to the second data line.

16. An apparatus, comprising:

a dummy pixel;

a first sub-pixel connected to a first data line; and a second sub-pixel connected to a second data line;

wherein the dummy pixel includes a first dummy driving transistor to be connected to the first sub-pixel under a first condition and a second dummy driving transistor to be connected to the second sub-pixel under a second condition, and wherein the dummy pixel is in a region located between the first and second sub-pixels.

17. The apparatus as claimed in claim 16, wherein the first data line is adjacent the second data line.

18. The apparatus as claimed in claim 16, wherein:

the first condition is when the first sub-pixel is defective, and the second condition is when the second sub-pixel is defective.

19. The apparatus as claimed in claim 16, wherein the dummy pixel is between the adjacent first and second data lines.

20. The apparatus as claimed in claim 16, wherein the first sub-pixel and the second sub-pixel emit light of different colors.

* * * * *